United States Patent
Deshpande

(10) Patent No.: US 7,640,358 B2
(45) Date of Patent: Dec. 29, 2009

(54) METHODS AND SYSTEMS FOR HTTP STREAMING USING AN INTELLIGENT HTTP CLIENT

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 329 days.

(21) Appl. No.: 11/778,610

(22) Filed: Jul. 16, 2007

(65) Prior Publication Data
US 2008/0114894 A1  May 15, 2008

Related U.S. Application Data

(60) Provisional application No. 60/865,150, filed on Nov. 9, 2006.

(51) Int. Cl.
*G06F 15/16* (2006.01)
(52) U.S. Cl. .................. 709/233; 709/232; 709/234
(58) Field of Classification Search .............. 709/232, 709/233, 234
See application file for complete search history.

(56) References Cited

U.S. PATENT DOCUMENTS

| | | | |
|---|---|---|---|
| 6,418,473 B1 | 7/2002 | St. Maurice et al. | |
| 7,039,717 B2 | 5/2006 | Johnson | |
| 2002/0078164 A1 | 6/2002 | Reinschmidt | |
| 2002/0112057 A1 | 8/2002 | Srinives | |
| 2002/0116500 A1 | 8/2002 | Arora et al. | |
| 2003/0002508 A1 | 1/2003 | Dierks | |

FOREIGN PATENT DOCUMENTS

WO    WO0124378    4/2001

OTHER PUBLICATIONS

Fielding R., Gettys J., Modul J. C., Frystyk G. Masinter L., Leach P., Berners-Lee T., "Hyper-text Transfer Protocol —HTTP 1.1," RFC 2616, Jun. 1999.
UPnP Content Directory Service Content Directory: 1 Service Template Version 1.01 for Universal Plug and Play Version 1.0, Jun. 25, 2002.
H. Schulzrinne, S. Casner, R. Frederick, V. Jacobson, "RTP: A Transport Protocol for Real-Time Applications", IETF RCF 1889, Jan. 1996.
H. Schulzrinne, A. Rao, R. Lanphier, "Real Time Streaming Protocol (RTSP)", IETF RFC 2326, Real Time Streaming Protocol (RTSP), Apr. 1998.
M. Handley, V. Jacobson, "SDP: Session Description Protocol", IETF RFC 2327, Apr. 1998.
Real Networks web site: http://www.realnetworks.com.
Windows Media Player Website: http://microsoft.com/windows/windowsmedia/.

*Primary Examiner*—Patrice Winder
*Assistant Examiner*—Taylor Elfervig
(74) *Attorney, Agent, or Firm*—Krieger Intellectual Property, Inc; Scott C. Krieger

(57) ABSTRACT

Elements of the present invention relate to systems and methods for controlling the transmission rate of HTTP streaming processes with an intelligent HTTP client.

19 Claims, 2 Drawing Sheets

METHODS AND SYSTEMS FOR HTTP STREAMING USING AN INTELLIGENT HTTP CLIENT

RELATED REFERENCES

Figure 1A:
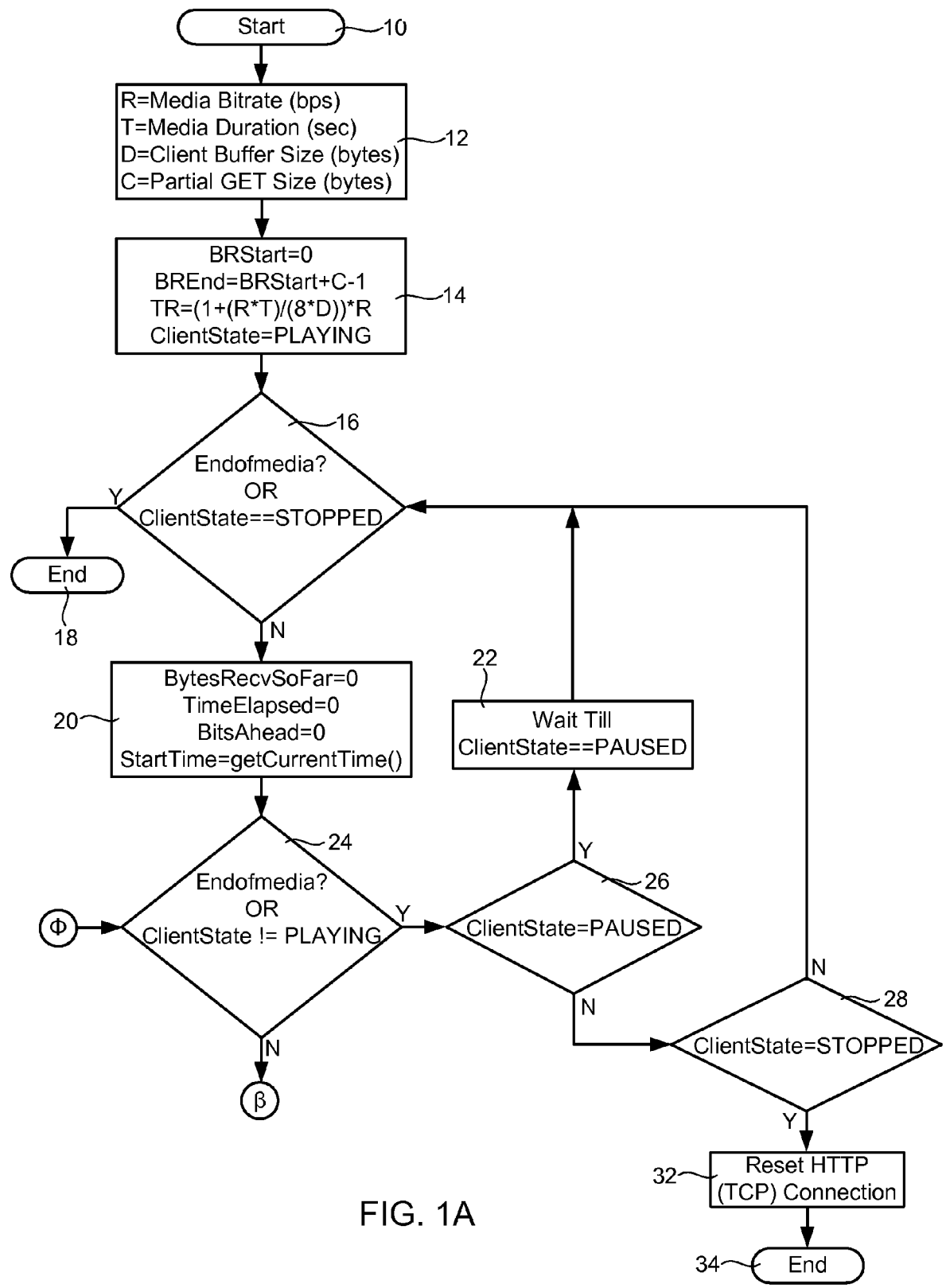

This application claims the benefit of U.S. Provisional Patent Application No. 60/865,150, entitled "Methods and Systems for HTTP Streaming," filed on Nov. 9, 2006 and which is hereby incorporated herein by reference.

BACKGROUND

Hypertext Transfer Protocol (HTTP) Streaming refers to the process of using HTTP for streaming media. HTTP runs on top of Transmission Control Protocol/Internet Protocol (TCP/IP) and was not designed for streaming media (audio/video) which has a continuous time base. Real Time Streaming Protocol (RTSP) together with Real-time Transport Protocol (RTP) is better suited for streaming media. One of the main differences between HTTP and RTP protocols is the entity that controls the data transfer rate:

HTTP: HTTP is a pull protocol. Data transfer rate is controlled from the client side when using HTTP. HTTP runs on top of TCP/IP, which has its own congestion control/flow control mechanism. This configuration results in an HTTP stream being sent from the server to the client at the available bandwidth.

RTP: (RTP) is a push protocol used for streaming media data. Thus, in the case of streaming media using RTP, the server controls the flow and rate of data transfer. Typically the server sends the data at the bitrate of the media stream.

In spite of the superiority of the RTSP/RTP protocols for streaming media, HTTP protocol is often used for streaming media data. Traditionally on the Internet, a user who wants to serve streaming media content has easy access to an HTTP server, however, RTP/RTSP servers are not as ubiquitous as HTTP servers. Also, in earlier days, the main mechanism for client connectivity to the Internet for the majority of the users was through a modem. Modems typically supported network speeds of 14/28/56 Kbps. The behavior of HTTP protocol in situations where the available client bandwidth is limited, such as with traditional telephone-line modems, is acceptable for streaming media with bit-rates comparable to the available client bandwidth. As an example a RealAudio stream of 20 Kbps can be streamed reasonably well using HTTP protocol for a client with 28.8 Kbps modem.

With the proliferation of broadband connections to the Internet and high-speed wired/wireless home networks, HTTP streaming, as used currently, has some problems. Let us consider a WiFi 802.11b home network, which can support bandwidths ranging from 1 Mbps to 11 Mbps. Let us consider the case of using HTTP streaming for streaming MP3 audio. The MP3 bit-rates can range from 32 Kbps to 320 Kbps. If HTTP streaming is used to stream the MP3 audio, then typically the HTTP client will end up pulling the data from the HTTP server at a rate much faster than the actual MP3 song bitrate.

The currently existing HTTP streaming clients use one of the following two approaches:

Approach 1: The HTTP client pulls data from the HTTP server at its available client bandwidth. The client media player buffers the data as it arrives. The buffered data is used for playback at the correct playback speed, which is equal to the actual media bitrate.

Approach 2: The HTTP client uses the TCP receive window as a parameter to do the flow control which can throttle the speed of transmission. The TCP sending side stack can have, at any time, several unacknowledged segments sent on the network before it stops and waits for the receiver to acknowledge the first segment. The TCP sender has a knowledge about the TCP receiver's "receive window size" which is the amount of available space in the receiving side buffer for this TCP connection. Using its knowledge about the receive window size and number of unacknowledged bytes sent, the sender stack stops sending data when it calculates that the receiver buffer is full. The receiver updates its receive window size field with each ACK sent back. When the sender sees that the receiver stack has free buffer space available it will again start sending the data.

Thus some HTTP streaming clients let the receive side buffer be filled using the available client bandwidth, but read the data (e.g. using recv( ) socket function) in the client application periodically based on the set client bandwidth preference. RealOne player with the preference "Connection Bandwidth" set to a lower number than the actual available bandwidth behaves this way.

Both of the above approaches have the following drawbacks:

The first approach requires a very large client side buffer if the available network bandwidth is much larger that the actual media bitrate.

The second approach relies on TCP flow control to achieve streaming. This approach can perform poorly. This is because:

Pause functionality cannot be efficiently supported without data transfer on the network or an additional proprietary protocol on top of HTTP. This is because the client can not indefinitely set its receive window size to zero to pause the TCP stream. If this is done the server side application will start returning non-success on send operations once the sender side TCP stack reaches its TCP send buffer size for this TCP connection. After a certain number of unsuccessful send( ) function calls the server application is likely to abort this connection. Thus the HTTP client will typically continue to receive the stream and buffer the stream while the user has paused the stream. Pause functionality is important for streaming media.

Exact behavior and performance of this approach is dependent on the particular TCP algorithm implemented by the client side For example the TCP on the client side may be TCP Reno/Tahoe/Vegas or other TCP variations like Delayed ACK algorithm, Fast Recovery algorithm, etc., all of which behave differently.

Exact behavior and performance of this approach is also dependent on the particular TCP stack implementation. This includes various parameters like buffer space available, etc., which are especially important for an embedded device acting as a client.

Relying on TCP receive window size to do rate control for streaming media could result in silly window syndrome. Silly window syndrome results in the receiving side stack sending several ACKs with small windows size updates back to the sender. This can result in the sender sending small TCP segments as the receive window space becomes available. This is typically detrimental to network performance in general.

Some receiving side TCP stacks, especially for embedded systems may not support setting the receive buffer size programmatically (typically setsockopt function with SO_RCVBUF option). The TCP stack will still perform the flow control as before but if the maximum receive window size is small, performance will suffer further and the network overhead will be larger.

The use of Approach 2 results in frequent congestion, which requires the client to stop playback and buffer the stream before starting the playback again, resulting in a poor user experience.

SUMMARY

Some embodiments of the present invention comprise methods and systems for measuring and regulating the transmission rate of a bitstream with an intelligent HTTP client.

BRIEF DESCRIPTION OF THE SEVERAL DRAWINGS

Figure 1B:
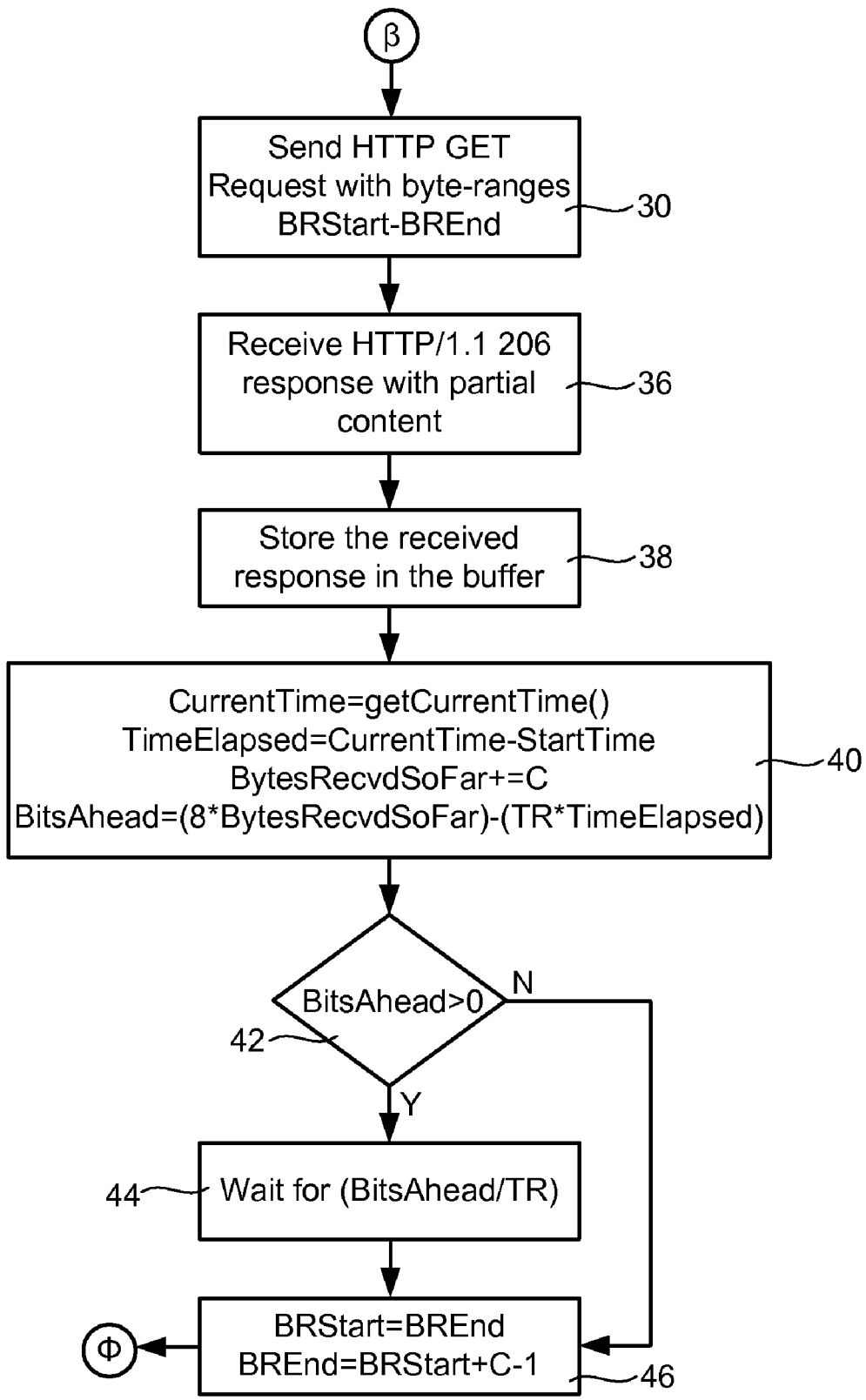

FIG. 1 is a chart showing methods of exemplary embodiments of the present invention comprising bitrate control.

DETAILED DESCRIPTION OF EXEMPLARY EMBODIMENTS

It will be readily understood that the components of the present invention, as generally described herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise a smart HTTP client approach, which uses the HTTP/1.1 byte ranges feature to achieve a better HTTP streaming performance. These embodiments do not require any change to the HTTP server side. These embodiments can support pausing the HTTP stream without any network data transfer occurring during the paused state. These embodiments do not rely on the TCP flow control so they will work with any TCP/IP stack. These embodiments do not need any change to the standard HTTP protocol and a client which can send HTTP/1.1 byte-range request can be used with the algorithm of these embodiments.

The term "client" may refer to a client player application as well as a client device. The term HTTP client is used to refer to the client part, which uses HTTP protocol for streaming.

In some exemplary embodiments of the present invention, the client application may find information about the media bitrate and the total size/duration for the streaming media it wants to playback. In these exemplary embodiments, this can be done by any of the following methods:

a) Using UPnP content directory service (CDS):
The 'res' element for a resource in UPnP AV content directory service is the element of most interest to us. The 'res' element supports an attribute 'bitrate' which can give the bitrate in bytes/second for the resource. The 'res' element supports an attribute 'size' which can give size in bytes of the resource. The 'res' element supports an attribute 'duration,' which can give the duration for the playback of the resource.

b) Using Session Description Protocol (SDP):
Session description protocol's <encoding parameters> field can be used to obtain the information about the media data to be streamed.

c) From the media payload data:
Many of the media payload data contain information about the media bitrate, size/duration of the media.

Let us assume that the streaming media bitrate in bits per second is R. Let us assume that the media duration is T seconds. Let S represent the media file size in bytes. Then the media file size (S) will be related approximately to the media duration (T) and the media bitrate (R) by the equation: $S=(R*T/8)$. In the following we will use the parameters R and T. Let us assume the client application has total available buffer size of D bytes. The buffer size parameter may be used to increase performance on embedded systems which have restricted memory and limited buffer size. Let us define symbol C to represent the chunk size in bytes. These embodiments comprise methods for keeping track of the current buffer state at the client. These embodiments may calculate a Bitsahead parameter and send, at the appropriate times, from the HTTP client, HTTP partial GET requests with byte-ranges fields set to the HTTP server. In these embodiments, the goal is to pace the HTTP data pulling from the client side in a manner that utilizes a target bandwidth in bits per second=$TR=(1+(R*T/8*D))*R$. In other embodiments the target rate TR may be determined as a function of media bitrate R and current amount of data in the client buffer.

This process, along with an algorithm for the pacing of HTTP partial GET requests shown below, ensures that the client will never run out of buffer space. The idea is we want to use the buffer space D as a cushion to make sure the player does not get starved of data.

Some embodiments of the present invention comprise methods and systems described by the algorithm shown in pseudo-code form below.

```
BRStart=0;
BREnd=BRStart+C-1;
TR=(1+(R*T)/(8*D))*R;
ClientState=PLAYING;
While((notEndofMediaStream) AND (ClientState!=STOPPED))
{
    BytesRecvdSoFar=0;
    TimeElapsed=0;
    BitsAhead =0;
    StartTime=getCurrentTime( );
    While((notEndofMediaStream) AND
    (ClientState==PLAYING))
    {
        send HTTP GET request with the byte ranges
    BRStart-BREnd;
        recv the HTTP 206 response with the partial
    content;
        store the received data to the buffer;
        CurrentTime=getCurrentTime( );
        TimeElapsed=CurrentTime-StartTime;
        BytesRecvdSoFar= BytesRecvdSoFar+C;
        BitsAhead= (8*BytesRecvdSoFar)- (TR*
    TimeElapsed);
        If(BitsAhead>0)
        {
            wait for time=(BitsAhead/TR);
        }
        BRStart=BREnd;
        BREnd=BRStart+C-1;
    }
```

-continued

```
if(ClientState==PAUSED)
{
    wait till the ClientState==PAUSED;
}
else if(ClientState==STOPPED)
{
    reset HTTP (TCP) connection for this session;
}
}
```

If the user requests to pause the stream, the client can provide the functionality without transferring any data on the network. This is achieved as can be seen in the pseudo-code above and the flowchart in FIG. 1, through the use of multiple HTTP partial GET requests by using byte-ranges, instead of using a single HTTP GET request. In some embodiments instead of multiple HTTP partial GET requests multiple HTTP GET requests each with URL parameters (corresponding to byte ranges) may be used.

If the user requests to stop the stream, in some embodiments, the client resets the HTTP (e.g., the underlying TCP) connection.

Some embodiments may use the HTTP persistent connection. This means each HTTP Partial GET request does not need to open a new TCP connection. Also, since the Approach 2 taken by currently existing systems needs to communicate the updated receive window size back to the server, possibly multiple times (after sender has sent the data equal to the receiver buffer size and is waiting for the receive window to open up), there is not much extra overhead on the TCP back channel from the client to the server while using these embodiments compared to Approach 2.

The chunk size C is chosen to be less than D. In some embodiments, it is possible to set the chunk size to C in byte-ranges but read the data at the application side in a loop with C/N bytes read every time. In some embodiments, techniques of the present invention may be used in combination with approach 2 or approach 1.

Some embodiments of the present invention may be described with reference to FIG. 1. These embodiments may commence 10 a process by acquiring information 12 about the media bitrate and the total size/duration for the streaming media to be played. In exemplary embodiments, this can be done via a UPnP content directory service (CDS), a Session Description Protocol (SDP) or from media payload data as described above. A client buffer size and partial GET command size or chunk size may also be determined at this stage.

Byte-range definition variables may then be initialized 14 to address the first chunk of data and a target bitrate or target bandwidth may be calculated 14. In these embodiments, a client state variable may be used to indicate whether a client device or user has requested that the media be played, paused or stopped entirely. In some embodiments, a process may check whether media play has been stopped and/or whether the end of a media file has been reached 16. If either case is true, the process may terminate 18. If these conditions are false, the process may proceed by determining a start time 20. In some embodiments, variables may also be initialized for monitoring the amount of data or number of bytes received, the elapsed time and the amount of data or number of bits that have been received relative to the target bitrate or bandwidth 20.

The processes of these embodiments may again check whether media play has been stopped or paused and/or whether the end of a media file has been reached 24. If media play has been paused 26, the process may wait 22 until play re-commences. If media play has stopped 28, the process may reset 32 the connection and terminate the process 34. If media play re-commences after a pause state 26 and wait period 22, the process may proceed to variable initialization and start time determination 20. When the media play has not been paused or stopped 24, the process may send an HTTP GET Request 30 with byte-range data identifying the next chunk of data in the media file. In response, the client device may receive 36 an HTTP response, such as an HTTP/1.1 206 response with the content identified by the byte-range data in the HTTP GET Request 30. The received response 36 may then be stored 38 in the buffer.

Once the response is stored 38 in the buffer, timing and quantity data may be determined 40. The current time may be determined and an elapsed time may be calculated from the current time and the start time obtained earlier. The amount of bytes received in the process may also be determined and updated. A bitsahead variable may also be determined. The bitsahead variable may represent how far the current bitrate varies from the target bitrate or bandwidth. In some embodiments, the bitsahead value may be determined by determining the number of bits received in the process and subtracting the number of bits that would have been received at the target bitrate. In some embodiments, this bitsahead value may be obtained by subtracting the value obtained from multiplying the target bitrate by the elapsed time from the value obtained by multiplying the number of bytes received by the number of bits in a byte (e.g., 8).

When the number of bits received is greater than the number of bits that would be received at the target bitrate 42 the process may wait 44 for a specific period or signal before proceeding to the byte-range reset 44. In some embodiments, this may occur when the bitsahead variable is greater than zero 42. In some embodiments, the specific period of the wait may be determined by dividing the number of bits received in addition to the number anticipated at the target bitrate and dividing this surplus by the target bitrate. In some embodiments, the client may not wait 44, even when bitsahead variable is greater than zero 42, as long as the client buffer has empty space in it.

If the number of bits received is not greater than the number of bits that would be received at the target bitrate 42, the process may reset 46 the byte-range data that identifies the data obtained in the HTTP GET Request to the next chunk of data. When the reset has occurred 46, the process may again check to see if the media file is exhausted and/or the process has been paused or stopped 24. If the process is still playing, the next chunk of media data may be requested 30 with the reset byte-range data. The process may cycle through this loop until the process is ended or the media file is exhausted. It should be noted that the pause state 26 causes the process to wait 22, which stops transmission of the media file so that the process no longer contributes to network congestion.

What is claimed is:

1. A method for regulating the rate of data transmission for data file, said method comprising:
   a) selecting first byte-range data to identify a first chunk of data in said data file;
   b) determining a target transmission rate wherein said target transmission rate is calculated using the equation: $(1+(R*T)/(8*D))*R$, wherein R is a media file bitrate, T is a media file duration and D is a client buffer size;
   c) sending an HTTP Get Request requesting said first chunk of data identified with said first byte-range data;
   d) receiving said first chunk of data in an HTTP Response;
   e) storing said first chunk of data in a client buffer;

f) determining whether the actual transmission rate of said first chunk of data exceeds said target transmission rate;

g) waiting for a specific wait period and then selecting new byte-range data to identify another chunk of data in said data file if said actual transmission rate exceeds said target transmission rate;

h) immediately selecting next byte-range data to identify an untransmitted next chunk of data in said data file if said actual transmission rate does not exceed said target transmission rate;

i) sending an HTTP Get Request requesting said next chunk of data identified with said next byte-range data;

j) receiving said next chunk of data in an HTTP Response;

k) storing said next chunk of data in a client buffer;

l) determining whether the actual transmission rate of all transmitted chunks of data exceeds said target transmission rate;

m) waiting for a specific wait period when said actual transmission rate of all transmitted chunks exceeds said target transmission rate; and n) selecting new next byte-range data to identify another untransmitted next chunk of data in said data file if said actual transmission rate of all transmitted chunks does not exceed said target transmission rate.

2. A method as described in claim 1 further comprising determining a client buffer fullness level and wherein said waiting is performed only when said actual transmission rate of all transmitted chunks exceeds said target transmission rate and said client meets a fullness requirement.

3. A method as described in claim 1 wherein said target transmission rate is dependent on a media file bitrate, a media file duration and a client buffer size.

4. A method as described in claim 1 wherein said HTTP Response is an HTTP/1.1 206 Response.

5. A method as described in claim 1 wherein said determining whether the actual transmission rate of said first chunk of data exceeds said target transmission rate comprises calculating a bitsahead variable.

6. A method as described in claim 1 wherein said determining whether the actual transmission rate of said first chunk of data exceeds said target transmission rate comprises calculating a bitsahead variable by subtracting the value obtained from multiplying the target bitrate by an elapsed time from the value obtained by multiplying the number of bytes received by the number of bits in a byte.

7. A method as described in claim 1 wherein said determining whether the actual transmission rate of said all transmitted chunks of data exceeds said target transmission rate comprises calculating a bitsahead variable by subtracting the value obtained from multiplying the target bitrate by an elapsed time from the value obtained by multiplying the number of bytes received by the number of bits in a byte.

8. A method as described in claim 1 wherein said specific wait period is determined by dividing the number of bits received in addition to the number of bits anticipated to have been received at the target bitrate and dividing this number by the target bitrate.

9. A method for regulating the rate of data transmission for a data file with an HTTP client, said method comprising:

a) determining a media file bitrate, R;

b) determining a media file duration, T;

c) determining a client buffer size, D;

d) determining a data chunk size, C;

e) selecting first byte-range data to identify a first chunk of data in said data file;

f) determining a target transmission rate, TR, with the equation:

$$TR = (1 + (R*T)/(8*D)) * R$$

g) determining a start time;

h) sending an HTTP Get Request requesting said first chunk of data identified with said first byte-range data;

i) receiving said first chunk of data in an HTTP/1.1 206 Response;

j) storing said first chunk of data in a client buffer;

k) determining a current time;

l) determining an elapsed time by subtracting said start time from said current time;

m) determining the number of bytes received in said first chunk of data;

n) calculating the number of bits received in addition to that which would have been received at said target bitrate by subtracting the value obtained from multiplying said target bitrate by said elapsed time from the value obtained by multiplying the number of bytes received by the number of bits in a byte;

o) waiting for a specific wait period and then selecting new byte-range data to identify another chunk of data in said data file if said number of bits received in addition to that which would have been received at said target bitrate is greater than zero, wherein said specific wait period is calculated by dividing said number of bits received in addition to that which would have been received at said target bitrate by said target bitrate; and p) immediately selecting said next byte-range data to identify said untransmitted next chunk of data in said data file if said number of bits received in addition to that which would have been received at said target bitrate is not greater than zero.

10. A method as described in claim 9 further comprising:

q) sending an HTTP Get Request requesting said next chunk of data identified with said next byte-range data;

r) receiving said next chunk of data in an HTTP/1.1 206 Response;

s) storing said next chunk of data in said client buffer;

t) determining a next current time;

u) determining an next elapsed time by subtracting said start time from said next current time;

v) determining a total number of bytes received at said next current time;

w) calculating a next number of bits received in addition to that which would have been received at said target bitrate by subtracting the value obtained from multiplying said target bitrate by said next elapsed time from the value obtained by multiplying said total number of bytes received by the number of bits in a byte x) waiting for a next specific wait period and then selecting next new byte-range data to identify another untransmitted chunk of data in said data file if said next number of bits received in addition to that which would have been received at said target bitrate is greater than zero, wherein said next specific wait period is calculated by dividing said next number of bits received in addition to that which would have been received at said target bitrate by said target bitrate; and y) immediately selecting said next new byte-range data to identify said untransmitted chunk of data in said data file if said next number of bits received in addition to that which would have been received at said target bitrate is not greater than zero.

11. A method as described in claim 9 further comprising determining whether a pause selection has been made and pausing said method wherein said pausing terminates all data transmission after step o) when said pause selection has been made.

12. A method as described in claim 9 further comprising determining whether a pause selection has been made and pausing said method wherein said pausing terminates all data transmission after step p) when said pause selection has been made.

13. A system for regulating the rate of data transmission for a data file, said apparatus comprising:
   a) a bitrate determiner for determining a media file bitrate, R;
   b) a file duration determiner for determining a media file duration, T
   c) a buffer determiner for determining a client buffer size, D;
   d) a size determiner for determining a data chunk size;
   e) a first byte-range selector for selecting first byte-range data to identify a first chunk of data in said data file;
   f) a target determiner for determining a target transmission rate, wherein said target transmission rate is calculated using the equation: $(1+(R*T)/(8*D))*R$;
   g) a sender for sending an HTTP Get Request requesting said first chunk of data identified with said first byte-range data;
   h) a data receiver for receiving said first chunk of data in an HTTP Response;
   i) a client buffer for storing said first chunk of data;
   j) a rate determiner for determining whether the actual transmission rate of said first chunk of data exceeds said target transmission rate;
   k) a delayer for waiting for a specific wait period and a selector for selecting new byte-range data to identify another chunk of data in said data file if said actual transmission rate exceeds said target transmission rate; and
   l) wherein said selector immediately selects said next byte-range data to identify said untransmitted next chunk of data in said data file if said actual transmission rate does not exceed said target transmission rate.

14. A system as described in claim 13 further comprising:
   a) said sender also sending an HTTP Get Request requesting said next chunk of data identified with said next byte-range data;
   b) said receiver also receiving said next chunk of data in an HTTP Response;
   c) said client buffer also for storing said next chunk of data;
   d) said rate determiner also determining whether the actual transmission rate of all transmitted chunks of data exceeds said target transmission rate;
   e) said delayer also for waiting for a specific wait period and said selector also for selecting new next byte-range data to identify another untransmitted next chunk of data in said data file if said actual transmission rate of all transmitted chunks exceeds said target transmission rate; and
   f) said selector also for immediately selecting said new next byte-range data to identify another said untransmitted next chunk of data in said data file if said actual transmission rate of all untransmitted chunks does not exceed said target transmission rate.

15. A system as described in claim 13 wherein said target transmission rate is dependent on said media file bitrate, said media file duration and said client buffer size.

16. A system as described in claim 13 wherein said HTTP Response is an HTTP/1.1 206 Response.

17. A system as described in claim 13 wherein said determining whether the actual transmission rate of said first chunk of data exceeds said target transmission rate comprises calculating a bitsahead variable.

18. A system as described in claim 13 wherein said determining whether the actual transmission rate of said first chunk of data exceeds said target transmission rate comprises calculating a bitsahead variable by subtracting the value obtained from multiplying the target bitrate by an elapsed time from the value obtained by multiplying the number of bytes received by the number of bits in a byte.

19. A system as described in claim 13 wherein said determining whether the actual transmission rate of said all transmitted chunks of data exceeds said target transmission rate comprises calculating a bitsahead variable by subtracting the value obtained from multiplying the target bitrate by an elapsed time from the value obtained by multiplying the number of bytes received by the number of bits in a byte.

* * * * *